May 19, 1970     C. E. ANDERSON     3,512,421
FAIL-SAFE VALVE OPERATOR

Filed Sept. 2, 1966     3 Sheets-Sheet 1

INVENTOR.
CLIFFORD E. ANDERSON
BY
AGENT

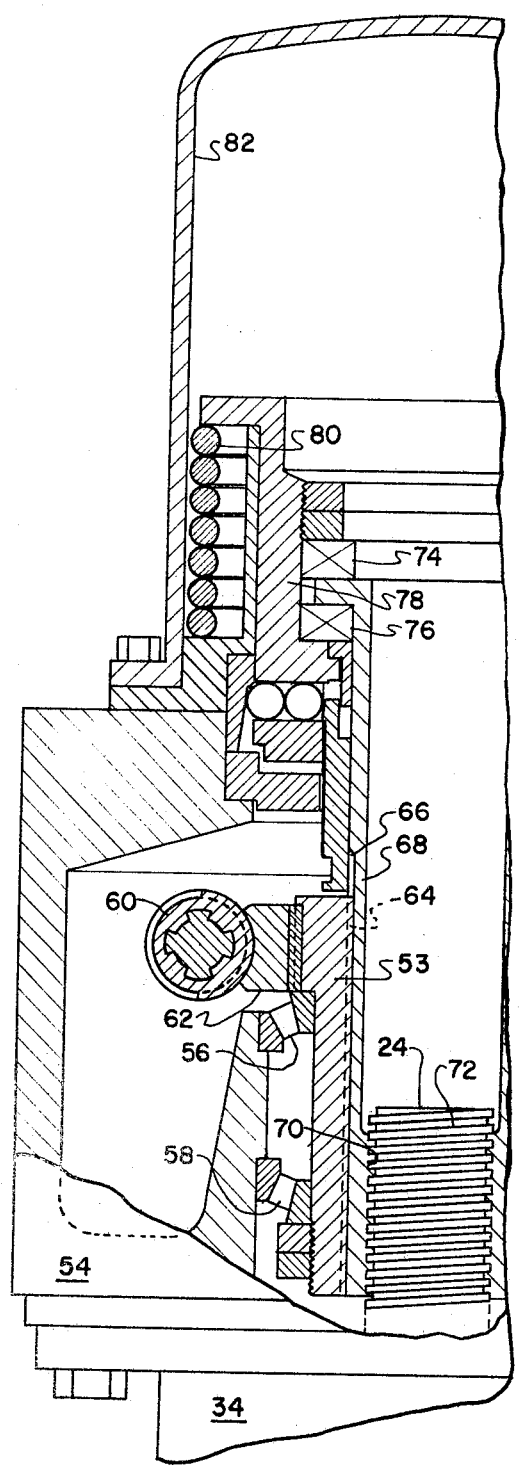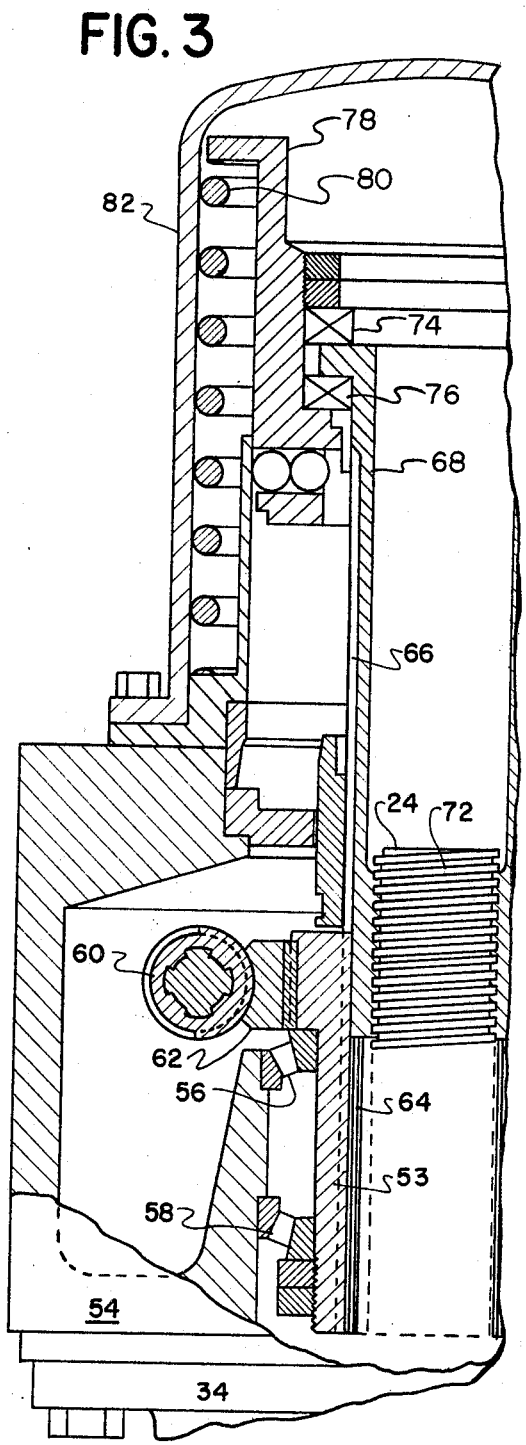

United States Patent Office 3,512,421
Patented May 19, 1970

3,512,421
FAIL-SAFE VALVE OPERATOR
Clifford E. Anderson, Houston, Tex., assignor to ACF Industries, Incorporated, New York, N.Y., a corporation of New Jersey
Filed Sept. 2, 1966, Ser. No. 577,041
Int. Cl. F16k 31/05, 31/10
U.S. Cl. 74—89.15        9 Claims

ABSTRACT OF THE DISCLOSURE

An operator mechanism for mechanical devices such as valves and the like and including structure for imparting reciprocal movement to a control stem of the mechanical device. A spring biased fail-safe mechanism is connected to the operating stem and capable of moving the operating stem to a predetermined "safe" position either selectively or automatically. A plurality of ball detents are carried by the fail-safe mechanism engage a fixed cam surface to lock the fail-safe mechanism in the "set" position. The ball detents are restrained by a keeper member which is capable of being moved to a position releasing the detents and which includes a tapered surface against which the detents are biased so that a resultant force is produced on the keeper which substantially balances the frictional forces developed between the ball detents and the keeper.

---

This invention relates generally to devices for remotely controlling opening and closing movements of gate valves and, more particularly, to a mechanism for selectively or automatically controlling the movement of a valve to a preselected safe position.

There are a number of different types of fail-safe power operators presently being manufactured, each of which serves to either automatically or selectively move the valve to a preselected safe position in response to undesirable conditions of operation. The safe position might be either the open or closed position, depending upon the design of the particular system involved. Power for actuation of the fail-safe operator might be taken from a pipeline controlled by the operator, or from a remote pressurized fluid storage source where the operator is provided with hydraulic actuation. This invention is particularly directed to fail-safe power operator mechanisms which utilize a compression spring as a source of stored energy for fail-safe actuation. This invention is particularly applicable to spring powered fail-safe mechanisms for hydraulic, electric or mechanically controlled power operator devices, but it is not desired to limit the scope of this application to spring powered fail-safe mechanisms. The fail-safe spring may be maintained in its latched position by detent means which may be carried by the movable fail-safe mechanism and which engage within latching recesses in an immovable portion of the valve operator housing.

Because of the force required to induce movement of the valve gate member between its open and closed positions is quite large, it is necessary to provide a fail-safe spring of considerable magnitude so that fail-safe movement of the valve may be effected at any of the possible operating conditions thereof. Because the fail-safe spring is of considerable magnitude, the locking detent structure, which is provided to maintain the fail-safe mechanism in its latched position, is of necessity maintained under considerable stress developing bearing stresses of considerable magnitude. Because of the high bearing stress generally applied to locking detent structures by the fail-safe spring, there will be developed considerable friction between the surfaces of the parts in engagement. This is generally unsatisfactory because release control mechanisms, such as a solenoid control frequently employed as a release control mechanism, for example, must be quite powerful in order to overcome the frictional forces applied by the detent mechanism thereto. It is also possible, because of the magnitude of the forces applied between the detent structure and the release mechanism, that the solenoid will not be able to overcome the frictional forces developed and the structure will, in effect, be locked in its latched position. This could result in an extremely dangerous condition depending upon the circumstances involved.

Accordingly, it is a primary object of this invention to provide a novel release control mechanism for a fail-safe operator which, because of structural relationship between the parts, produces resultant forces acting on the latching detent structures which overcome or substantially balance the frictional forces between the parts.

It is a further object of this invention to provide a novel release control mechanism for a fail-safe operator which includes surfaces for proper positioning the detent structure during movement of the fail-safe mechanism between its safe and locked position.

Briefly, the invention comprises a fail-safe operator for gate valves and the like, which may include a drive mechanism connected through suitable gearing to the valve stem of a valve for selectively moving the valve between its open and closed positions. Other operator power mechanisms, such as hydraulic motor actuators or electrical actuators, may be employed within the scope of the invention. A fail-safe mechanism including a compression spring of considerable magnitude is interposed between a movable retainer member indirectly connected to the valve stem and an operator housing which provides an enclosure for the operator mechanism. The fail-safe mechanism, in the operational position of the valve, is maintained in a position retaining the fail-safe spring under compression and is operative responsive to predetermined conditions to allow release of the fail-safe mechanism to extend the valve stem to a preselected fail-safe position.

For locking the fail-safe mechanism of the valve operator in a latched condition where the spring is restrained in its compressed position, a detent locking mechanism including a plurality of spherical detent members is carried by the fail-safe mechanism and is interposed between the fail-safe mechanism and the housing structure of the operator to prevent relative movement between the fail-safe mechanism and the housing. A solenoid actuated keeper member, in the latched position thereof, is positioned to maintain the detent members in their latched position, thereby maintaining the fail-safe mechanism in its latched condition. For actuating the fail-safe mechanism, the keeper member is retracted upon de-energization of the solenoid, thereby allowing the detent mechanism to be forced to a position allowing relative movement between the fail-safe mechanism and the housing structure of the operator. The structural relationship between the housing surfaces engaged by the detent members and the surface of the keeper engaged by the detent members is such that a resultant force is produced on the keeper member, which balances or slightly overcomes the frictional engagement force between the detent members and the keeper member. This allows the keeper solenoid to be of small capacity and prevents the possibility of locking the fail-safe mechanism in its latched position. Structural interrelation between the detent members and the wall surface of the operator housing and the detent positioning surface of the keeper is such that relative movement between the fail-safe control mechanism and the housing will cause proper positioning of the detent members in their locking positions.

Other and further objects of the invention will become obvious upon an understanding of the illustrative embodiments about to be described, or will be indicated in the appended claims, and various advantages not referred to herein will become apparent to one skilled in the art upon employment of the invention in practice.

Preferred embodiments of the invention, which have been chosen for purpose of illustration and description, are shown in the accompanying drawings forming a part of the specification wherein:

FIG. 2 is a partial elevational view of the invention in section illustrating the electrically controlled fail-safe operator of FIG. 1 in its latched position.

FIG. 3 is a fragmentary elevational view of the invention in section illustrating the electrically controlled fail-safe operator of FIG. 1 in its safe condition.

Figure 1:
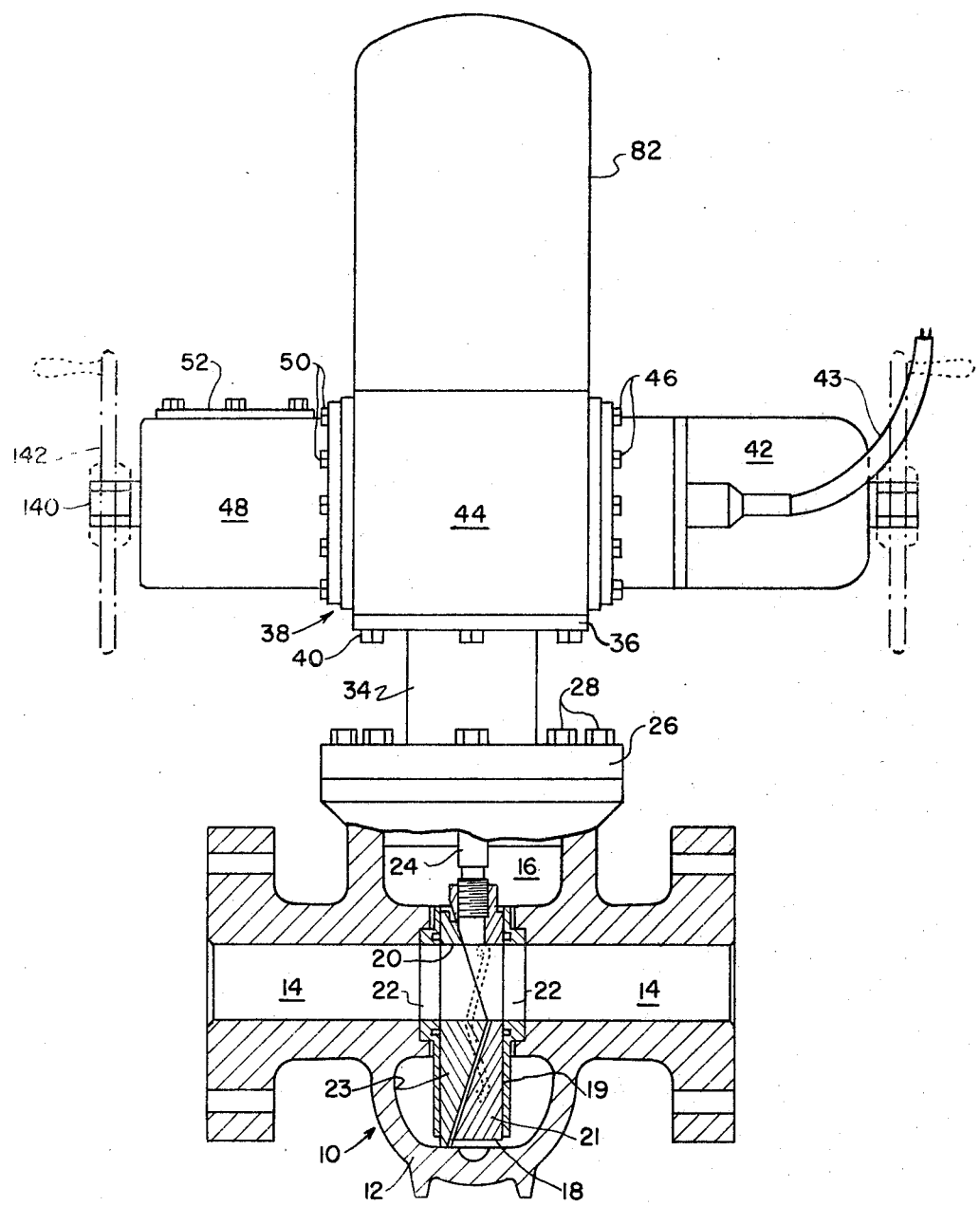
FIG. 1 is an elevational view of a gate valve shown partially in section and provided with an electrically controlled fail-safe operator constructed in accordance with this invention.
Figure 4:
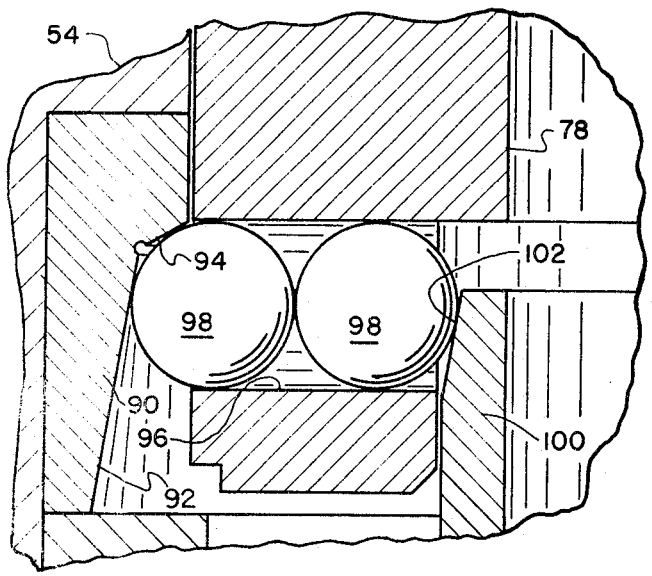
FIG. 4 is a fragmentary sectional view of the invention of FIGS. 1 and 2 illustrating the latching mechanism of the fail-safe operator in its latched condition.

Referring now to the drawings for a better understanding of the invention, in FIG. 1 is disclosed a valve 10 having a valve body 12 with aligned flow passages 14 formed therein for allowing the flow of fluid through the valve. Intersecting the flow passages 14 is a valve chamber 16, in which is positioned a reciprocating valve member 18. The valve member 18 has a passage 20 formed therein, which in the open position of the valve is aligned with the flow passages 14 forming a smooth conduit for the uninterrupted flow of fluid therethrough, and a solid portion 19, which in the closed position of the valve cooperates with a seat member to block the flow of fluid through the flow passages 14. The valve 18 is reciprocated for controlling the flow of fluid through the valve passages 14 by an operating stem 24, which is attached to one extremity of the valve member 18. The valve member 18, illustrated in FIG. 1, is of a parallel expanding double wedge type and consists of a gate 21 to which the stem 24 is connected and a segment 23 which cooperates with the gate 21 for expanding the gate into tight sealing engagement with the seat members 22. The particular valve construction shown in FIG. 1 is intended merely for purpose of illustration and is not intended as limiting in regard to this invention. Various other types of valves and other mechanical devices which are controlled by reciprocating stems may be controlled by a power operator as described in detail hereinbelow. A bonnet member 26 is fixed to the upper portion of the valve body 12 in any desired conventional manner to provide a sealed closure for the valve body 12 and includes a conventional packing assembly for the establishment of a fluid-tight seal between the valve stem and the bonnet. A yoke tube 34, fixed to or formed integral with the bonnet 26, is provided with a flange 36 at its upper extremity, which provides a support for an electrically energized power operator 38, fixed to the flange 36 by a series of bolts 40. For imparting movement to the power operator, a motor 42, which might be an electrically energized motor, a pneumatic motor, hydraulic motor, etc., is connected to housing 44 by a series of bolts 46. An operator control assembly housing 48 may be fixed to the operator housing 44 by a series of bolts 50 as illustrated in FIG. 1, or may be integral with the operator housing as illustrated in FIG. 4. The control assembly housing is provided with an inspection plate 52, which is removable for assembling and adjusting the control circuitry of the operator. Electrical power to operate and control the electrical devices is supplied from a remote control station through an electrical cable 43.

With reference now particularly to FIGS. 2 and 3, the operator fail-safe mechanism includes a tubular drive sleeve 53 rotatably mounted within a housing 54 of the operator by upper and lower bearing members 56 and 58, respectively. The tubular drive sleeve 53 is driven by a form 60, which imparts rotary movement to a worm gear 62 carried by the drive sleeve. The worm gear 60 is driven either directly or through suitable gear connections by the motor 42 of the operator. The drive sleeve 53 is provided with internal splines 64 which mate with external splines 66 formed on a tubular drive shaft 68. The drive shaft 68 is provided at its lower extremity with internal threads 70 which mate with the threads 72 of the valve stem 24. Rotational movement of the drive shaft 68, induced by the worm gear and spline connection with the drive sleeve 53, will cause vertical movement of the valve stem 24.

The drive shaft 68 is connected at its upper extremity by means of upper and lower bearings 74 and 76 to a generally tubular retainer member 78. A compression spring 80 is interposed between the upper extremity of the retainer member 78 and an upper wall of the housing 54. A cover 82, which is fixed to the housing in any desired manner, provides a protective enclosure for the internal parts of the operator.

In the latched position of the fail-safe mechanism, the retainer spring 80 is compressed to the position illustrated in FIG. 2, and the retainer 78 is maintained at its latched or FIG. 2 position maintaining the drive shaft 68 at its FIG. 2 position. Upon release of the retainer member 78, as will be discussed in detail hereinbelow, the compression spring 80 will drive the retainer member 78 to the safe position as shown in FIG. 3. Through the thrust bearing connection between the retainer and drive shaft, the spring 80 will force the drive shaft 68 upwardly to the safe position thereof as illustrated in FIG. 3. As the drive shaft 68 is moved vertically by the compression spring 80, the valve stem 24, through its threaded connection with the drive shaft, is also moved vertically, thereby moving the gate of the valve to its preselected safe position.

Figure 5:
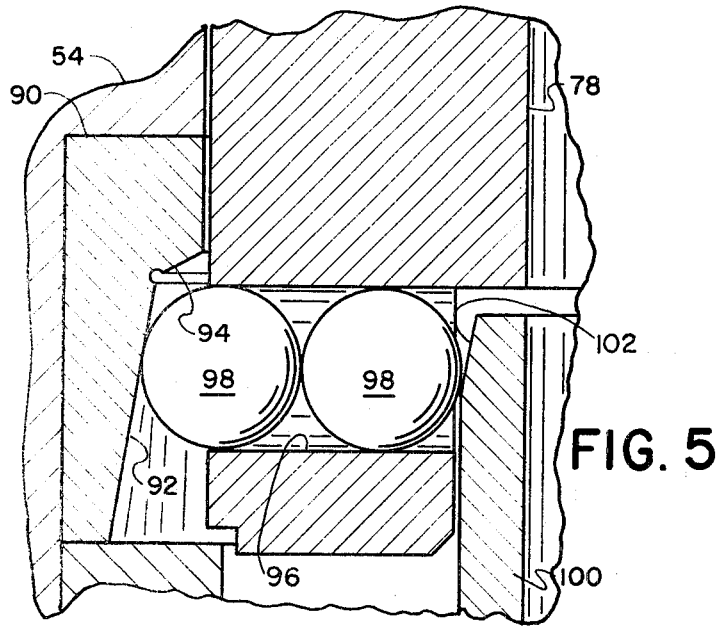
FIG. 5 is a fragmentary sectional view of the latching mechanism of the invention of FIGS. 1 and 2 illustrating positioning of the locking detent structure at the over-travel position of the fail-safe mechanism.

For maintaining the retainer member in the latched position thereof, FIGS. 4 and 5 illustrate in detail a latching mechanism for controlling actuation of the fail-safe mechanism of the operator. The operator housing 54 has an annular latching insert 90 fixed internally thereof and defining a frusto-conical detent locater surface 92. The latching insert 90 also includes a frusto-conical detent cam surface 94, which is disposed generally coaxial with the frusto-conical surface 92, but is of larger included angle than the surface 92. The latching insert 90 is formed of extremely hard metal to prevent undesirable deformation thereof by the latching detent structure of fail-safe mechanism.

The tubular retainer member 78 is provided with a series of transverse bores 96 disposed at its lowermost extremity. In each of the transverse bores 96 is disposed a pair of spherical locking detents 98, one of which engages the detent cam surface 94 in the latched position of the fail-safe operator. A generally tubular keeper member 100 is disposed with its uppermost extremity within the lowermost extremity of the retainer member 78. The keeper member 100 is reciprocated between the full line position and the dash line position illustrated in FIG. 4 by a solenoid controlled mechanism as illustrated schematically in FIG. 6. The keeper member 100 is provided at its upper extremity with an external frusto-conical detent positioning surface 102 which supports the innermost one of the detents 98 in the latched position of the fail-safe mechanism, thereby causing the outer detents to maintain the fail-safe mechanism of the operator in its latched condition. Upon deenergization of the solenoid control circuitry, as will be discussed in detail hereinbelow, the keeper member will be moved to the dotted line position as illustrated in FIG. 4, thereby releasing the detent members 98. As illustrated in FIG. 4 with the fail-safe mechanism of the operator in its latched position, the compression spring 80 will bias the retainer 78 in an upwardly direction. The cylindrical surface of the detent aperture 96 will bear upon the lower surface of the outer detents 98, forcing the detents upwardly into bearing engagement with the frusto-conical cam surface 94. The cam surface 94, in its engagement with the outer detents 98, produces a resultant force on the outer detents in the direction of the inner detent. This resultant force is transferred to the frusto-conical detent positioning surface 102 through the inner detents 98. Because the surface 102 is of frusto-conical configuration, the inner detents 98, bearing thereagainst, will produce a resultant force against the keeper member 100, applied in a slightly downwardly direction. This resultant force is of a sufficient magnitude to balance or slightly overcome the frictional force developed between the frusto-conical surface 102 and the inner detents 98. The keeper member 100, therefore, will be subjected to negligible forces from the latching detent structure, thereby allowing the return movement of the keeper 100 to be controlled by a low magnitude solenoid return spring. The resultant force applied to the keeper member 100 by the inner detent members 98 effectively eliminates any possibility of the keeper member becoming locked in the latched position by the frictional forces between the keeper member and the inner detents.

With reference now to FIG. 5, the fail-safe mechanism of the operator is disposed in a position of overtravel to insure proper positioning of the spherical detent members to properly latch the fail-safe mechanism. When the fail-safe mechanism of the operator is being moved from its unlatched or failed position as illustrated in FIG. 3 to the latched or FIG. 2 position thereof, the operator motor automatically drives the retainer member 78 slightly beyond its latched or FIG. 4 position. The detent locator surface 92 of the latching insert 90 and the frusto-conical surface 102 of the keeper member 100 are disposed concentrically and have identical included angles. The surfaces 92 and 102 therefore are equidistant at any point therealong. It is seen, therefore, that as the retainer member 78 moves to its overtraveled position, as illustrated in FIG. 5, the spherical detents 98 remain in contact with their respective frusto-conical surfaces and are subjected to slight lateral shifting as the surface 102 cams the inner detent member 98 in an outwardly direction. The operator motor is then reversed, causing the drive shaft 68 to be counter-rotated with respect to the valve stem 24, thereby allowing the retainer member 78 to be slightly biased upwardly by the compression spring 80 to the latched position thereof. The detent locater surface 92, during the slight upward movement of the retainer member, will cam the outer spherical detents 98 inwardly, thereby forcing the inner detents to shift inwardly, maintaining proper positioning in contact with or in close proximity to the frusto-conical surface 102 of the keeper member 100. Because the two frusto-conical surfaces are equidistant, the spherical detent members maintain substantial contact with their respective frusto-conical surfaces during the slight vertical movement of the retainer member 78. Upon reaching the FIG. 4 position, the outer detents 98 will engage the cam surface 94 of the latching insert 90, thereby locking the retainer members 78 in the position illustrated in FIGS. 2 and 4.

Figure 6:
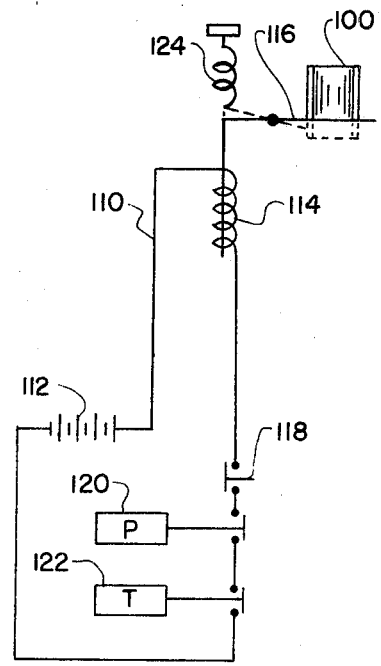
FIG. 6 is a schematic illustration of the electrical circuitry for controlling the position of the keeper of FIGS. 2–5.

As illustrated in FIG. 6, the solenoid control mechanism for the keeper member 100 comprises a simple electrical circuit 110 including a source 112 of electrical energy. A solenoid 114 is connected to the keeper member 100 through suitable mechanical interconnections, such as a pivoted arm 116, for example. Energization and deenergization of the circuit 110 may be controlled either by a manually operated switch 118, a pressure controlled switch 120 or a torque controlled switch 122 to effect actuation of the fail-safe mechanism. The switches 118, 120 and 122 are normally closed and are opened responsive to predetermined conditions to deenergize the circuit 110. For example, the pressure control switch 120 may be responsive to internal fluid pressure of the valve with which the operator is associated and may be operative responsive either to high pressure or low pressure or both high and low pressures to deenergize the circuit 110. The torque switch 122 may deenergize the circuit 110 responsive to excessively high operator torque, which, for example, might be encountered if foreign matter becomes lodged within the bore of the gate valve, thereby preventing closure of the valve. The solenoid 114, when energized, will move the keeper member 100 to the latching position by means of the mechanical connection between the keeper and the solenoid, as illustrated in full lines in FIG. 4. Upon opening of either of the switches 118, 120 or 122, the circuit 110 will become deenergized and biasing means such as a solenoid return spring 124 will move the keeper member to the dash line position as illustrated schematically in FIG. 6 and as shown in dash lines in FIG. 4. The keeper member 100 will also be moved to its unlatched position upon failure of the electrical circuit, either due to failure of the source of electrical energy 112 or other physical damage to the circuit 110.

With the fail-safe mechanism of the power operator in its FIG. 3 or safe condition, the fail-safe mechanism may be reset by energizing the motor 42 of the operator to rotate the worm gear 60 and, through the splined connection between the drive sleeve 53 and the drive shaft 68, to impart rotation to the drive shaft 68. Since the valve stem 24 in the safe position of the operator will be at its uppermost limit, further upward movement thereof will be prevented and rotation of the drive shaft 68 will cause the threaded connection between the stem 24 and the drive shaft 68 to force the retainer member 78 downwardly, thereby causing compression of the spring 80. Downward movement of the retainer member 78 toward the FIG. 2 position thereof is continued until the retainer reaches the position of overtravel, as shown in FIG. 5, at which position the frusto-conical surfaces 92 and 102 will properly position the spherical detents 98. At this time the operator motor 42 will be reversed either manually or automatically causing the threaded engagement between the drive shaft 68 and the valve stem 24 to allow slight vertical movement of the retainer member 78, bringing the cam surface 94 into intimate engagement with the outer detent members 98, and thereby locking the fail-safe mechanism in its FIG. 4 or latched position. Continued rotation of the power operator motor in this direction will drive the valve stem 24 downwardly, thereby moving the gate element 21 of the valve 10 to its open position. Upon reaching the full open position of the valve, the motor 42 will be deenergized by conventional automatic control circuitry not shown. The solenoid energization circuit 110, however, will remain energized maintaining the keeper member 100 in its latched position until such time as fail-safe actuation may subsequently occur. The valve 10, after completion of the operation resetting the fail-safe mechanism, will be in its open position allowing the flow of fluid therethrough and the fail-safe mechanism of the operator will be disposed in its latched position as illustrated in FIG. 2. The valve member may be moved to its closed or safe position under these conditions merely be deenergizing the solenoid control circuit 110 in the manner discussed above, causing the retainer member 78 to be released and allowing the compression spring 80 to force the retainer, drive shaft and valve stem upwardly to the safe position thereof.

It is evident, therefore, that I have provided an electrically controlled mechanism for positively maintaining a spring baised fail-safe valve operator in a latched condition and for releasing the fail-safe operator mechanism, responsive to preselected conditions, to effect movement of the fail-safe mechanism of the operator to its safe position. My invention specifically includes equidistant frusto-conical detent positioning surfaces which are effective to assure proper positioning of the detent members of the fail-safe operator latching mechanism during resetting of the fail-safe mechanism. The detent members are shifted laterally by the detent positioning surfaces as the operator is moved beyond its normal latched position for detent positioning. The bearing surfaces of the detent cam surface of the latching insert and the detent positioning surface of the keeper member are so related to the spherical detent members that a force applied by the cam surface to the outer detent members causes the inner detent members to apply a force to the keeper tending to bias the keeper member slightly downwardly. This biasing force is sufficient to substantially balance the frictional force applied between the inner detent members and the keeper member. This feature allows the keeper member to be retracted by a relatively small magnitude solenoid return force and effectively prevents locking of the keeper member by friction in the latched position thereof. The invention, therefore, is one well adapted to attain all of the objects hereinabove set forth together with other advantages which are obvious and inherent from a description of the apparatus itself.

It will be understood that certain features and subcombinations are of utility and may be employed without reference to other features and subcombinations. This is contemplated by and is within the scope of the appended claims.

As many possible embodiments may be made of the invention without departing from the spirit or scope thereof. It is to be understood that all matters herein set forth are shown in the accompanying drawings and are to be interpreted as illustrative and not in a limiting sense.

I claim:

1. A fail-safe mechanism for a valve operator having a housing, a retainer member disposed within said housing and being movable between latched and safe positions, means within said housing defining a detent locater surface and a detent cam surface, detent aperture means formed in said retainer means, detent means movably disposed within said detent aperture means and being simultaneously engageable with said detent locater surface and said cam surface in the latched position of said retainer member to prevent relative movement between the retainer member and the housing, keeper means disposed within said housing and being movable between latched and safe positions, means for selectively moving said keeper means between said latched and safe positions, said keeper means in the latched position thereof being positioned adjacent said detent aperture means and having a detent positioning surface thereof in engagement with said detent means and maintaining said detent means in engagement with said detent locater surface and said detent cam surface, said keeper member being moved out of contact with said detent means in the safe position thereof, thereby allowing said cam surface to force said detent means fully into said aperture means and thereby release said retainer member from said housing, said detent locater surface and said detent positioning surface both being frusto-conical surfaces generally formed about a common center line and having substantially identical included angles, whereby said retainer member may be moved relative to said housing without causing disengagement of said detent means with either said detent locater surface or said detent positioning surface.

2. A fail-safe mechanism as set forth in claim 1, said detent means comprising at least one spherical detent member loosely positioned within each of said aperture means, said cam surface in the latched position of said fail-safe mechanism biasing said detent means into engagement with said keeper means thereby biasing said keeper means toward the safe position thereof, said bias applied to said keeper means being sufficient to substantially balance friction forces applied to said keeper means by said detent means.

3. A fail-safe mechanism as set forth in claim 1, a cylindrical insert of hardened metal forming a part of said housing and having said detent locater surface and said cam surface defined on the interior thereof, said detent locater surface and said cam surface defining frustums of concentric cones having different included angles.

4. A fail-safe mechanism as set forth in claim 3, said retainer member being generally cylindrical in shape and said aperture means extending through the cylindrical wall thereof, said detent means comprising at least one spherical detent member loosely disposed within said aperture.

5. A fail-safe mechanism as set forth in claim 4, said keeper means being of generally cylindrical shape and being disposed for axial movement within said housing, said keeper means having one extremity thereof positioned within said generally cylindrical retainer member, said one end of said keeper means having said detent positioning surface formed thereon.

6. A fail-safe valve operator comprising an operator housing, a drive shaft within the housing and adapted to threadedly receive the threaded operating stem of a rising stem gate valve, a retainer member connected to said drive shaft and being movable between latched and safe positions, means biasing said retainer member in a direction away from said stem, latching means within said housing defining a frusto-conical detent cam surface and a frusto-conical detent locater surface, a plurality of detent apertures formed in said retainer member, at least one detent means disposed in each of said apertures, said detent means in the latched position of said retainer member engaging said latching means to maintain said retainer member in immovable relation with said housing, keeper means movably disposed within said housing and engaging said detent means in the latched position of said retainer to maintain said detent means in engagement with said latching means, means controlling movement of said keeper means, said detent cam surface engaging said detent means in the latched position of said retainer member and applying a force through said detent means to said keeper means which force substantially balances friction forces developed between said keeper means and said detent means, whereby said keeper means may be moved out of engagement with said detent means by a small force applied by said keeper movement control means.

7. A fail-safe valve operator as set forth in claim 6, said latching means and said keeper means having frusto-conical surfaces thereon concentrically disposed in spaced relation and having substantially identical included angles, said frusto-conical surfaces engaging said detent means in the latched position of said fail-safe mechanism.

8. A fail-safe valve operator as set forth in claim 7, said detent means comprising a pair of spherical members disposed in each of said apertures.

9. In a valve operator for moving a threaded rotatable valve stem axially between two limit positions, one of which is the fail-safe position for the valve; a housing; an elongated rotatable nut having a portion internally threaded for engagement with said stem and externally keyed for sliding engagement with a power driven drive sleeve; a non-rotatable thrust sleeve; a ball carriage secured to said thrust sleeve; means connecting said thrust sleeve and ball carriage to said nut for axial movement together while allowing rotational movement of said nut independently of said thrust sleeve; fail-safe spring means connected between said thrust sleeve and a fixed part of said housing for spring loading said thrust sleeve, ball carriage and nut toward said fail-safe limit position; a plurality of radially directed axially counterbored holes in said ball carriage; a plurality of locking balls in each of said radial holes; an annular ball release surrounding said nut and having one end thereof beveled and projecting into the counterbores of said radial holes for maintaining said balls in such position that a substantial portion of one ball projects radially outwardly from each hole; an annular holding groove fixed in said housing for receiving the projecting portions of said balls when said thrust sleeve and ball carriage are so positioned axially that said radial holes are in alignment with said fixed annular holding groove, a wall of said groove being inclined to transmit a radially inward force component to said projecting balls in response to the axial force component of said spring-loaded thrust sleeve and ball carriage, said radially inward force component on said balls exerting in the latched position an axial force component on said ball release in a direction urging withdrawal of said ball release from said radial holes; trigger latch means; means coupling said trigger latch means to said ball release to oppose movement of said ball release in the withdrawal direction; and power energized means for controlling said trigger latch means.

References Cited

UNITED STATES PATENTS

| | | | |
|---|---|---|---|
| 3,309,942 | 3/1967 | Caldwell | 74—625 |
| 3,324,741 | 6/1967 | Anderson | 74—625 |

FRED C. MATTERN, JR., Primary Examiner

F. D. SHOEMAKER, Assistant Examiner

U.S. Cl. X.R.

74—2, 424.8, 625; 251—67, 69, 71